United States Patent [19]
Bühler

[11] Patent Number: 4,766,281
[45] Date of Patent: Aug. 23, 1988

[54] PULSE GENERATOR SPARK-EROSIVE METAL WORKING

[75] Inventor: Ernst Bühler, Losone, Switzerland

[73] Assignee: AG für industrielle Elektronik AGIE Losone bei Locarno, Losone, Switzerland

[21] Appl. No.: 120,351

[22] Filed: Nov. 13, 1987

[30] Foreign Application Priority Data

Nov. 17, 1986 [DE] Fed. Rep. of Germany ....... 3639256

[51] Int. Cl.$^4$ ............ B23H 7/14; G05F 1/44; H02M 3/335
[52] U.S. Cl. .................. 219/69 P; 323/287; 363/21
[58] Field of Search ............ 219/69 P, 69 C; 323/287, 271, 272; 363/20, 21

[56] References Cited

U.S. PATENT DOCUMENTS

| | | | |
|---|---|---|---|
| 3,745,444 | 7/1973 | Calkin et al. | 323/287 |
| 3,832,510 | 8/1974 | Pfau et al. | 219/69 C |
| 4,678,885 | 7/1987 | Dresti et al. | 219/69 C |
| 4,713,516 | 12/1987 | Bühler et al. | 323/287 |

*Primary Examiner*—A. D. Pellinen
*Assistant Examiner*—Geoffrey S. Evans
*Attorney, Agent, or Firm*—Helfgott & Karas

[57] ABSTRACT

A pulse generator for spark-erosive metal working contains a charge regulator circuit for charging a storage capacitor. A storage capacitor is sinusoidally discharged across a switching device to a spark gap. Charging always occurs in a defined manner independently of the preceding pulses, so that uniform pulses can be generated. The storage capacitor is charged with an energy excess of required for discharge and the energy still remaining after spark discharge is recovered in a d.c. voltage source. The switching device (3) is non-conductive only when the discharge current has substantially decayed.

7 Claims, 1 Drawing Sheet

PULSE GENERATOR SPARK-EROSIVE METAL WORKING

BACKGROUND OF THE INVENTION

The invention relates to a pulse generator for spark-erosive metal working.

The tendency in spark erosion technology is towards ever higher working or machining rates. Therefore pulse generators are required, which are able to supply high energy levels with a high repetition rate to the spark gap. High energy pulses with a clearly defined, very short pulse time are particularly required in the field of spark-erosive wire cutting and drilling.

German Pat. No. 27 35 403 = U.S. Pat. No. 4,163,887 discloses a pulse generator, which supplies a pulse current up to 500 A in the 1 microsecond range. However, pulse currents up to 1000 A at approximately 2 microseconds are presently required. The aforementioned generator type is too large and is also not economical (due to its poor efficiency of typically 10%) when such high currents are required.

German Pat. No. 34 19 945 discloses a generator with an efficiency of better than 60%. As this generator is designed for all spark-erosive working types, it becomes technically too complex for the applications described above. In addition, the switching devices used therein must switch out the full peak current, which leads to unnecessary switching losses.

German Pat. No. 24 42 734 discloses a generator, in which by means of an electronically controlled charging regulator a storage capacitor is linearly charged. On reaching the charging voltage, the capacitor is discharged via a switching device and an isolation transformer into the spark gap. Generators of this type are technically complex and have a limited range of control because the discharge must always be initiated when the storage capacitor is completely charged, which in certain circumstances coincides with unfavorable conditions in the spark gap.

Another type of generator is described in U.S. Pat. No. 3,485,987, where the charging current for a storage capacitor is coupled into the erosion circuit across an isolation transformer. The storage capacitor is alternately charged by means of a first switching device and discharged by means of a second switching device. However, this arrangement has the serious disadvantage that in the case of a "no-load pulse", i.e. a pulse which does not ignite a spark, the storage capacitor is not recharged so that the circuit is consequently only operative for the next but one pulse. There are also reactions between the two switching devices across the isolation transformer, which can only be controlled by high protective wiring expenditure.

Various other resonant circuit generator circuits are known, which have the advantage that the switching devices commutate dead or with only a limited current.

An important disadvantage of generators with electronically controlled charging regulators is that they are subject to deterioration of overall efficiency. Resonant circuit generators without controlled charging regulators suffer from the disadvantage of difficultly controllable current pulses (across the spark gap), because the charging state of the storage capacitor is greatly influenced by the preceding pulse.

SUMMARY OF THE INVENTION

It is an object of the present invention to provide a pulse generator wherein high energy pulses can be generated with a good efficiency.

Another object is to provide a pulse generator wherein the charging state of the storage capacitors is independent of the preceding discharges, while the circuit must be simply constructed, spatially small and operationally reliable.

In accordance with one embodiment of the invention, the pulse generator has first and second output terminals and is adapted for use with a load including a spark gap and connected across the output terminals in order to work metals by spark erosion.

The generator includes a direct current source having positive and negative terminals and producing a constant direct voltage between the positive and negative terminals, the positive terminals being connected to the first output terminal.

The generator also includes a storage capacitor, a switching device having mutually exclusive conductive and non-conductive states, and a first back-resonating blocking rectifier. The capacitor, the device and the first rectifier are connected in series between the first and second output terminals and the capacitor is connected directly to the first output terminal.

The generator also includes a second charge reversal rectifier and a transformer having primary and secondary windings which are poled in opposite sense. The capacitor, the primary winding and the second rectifier are connected in series between the positive and negative terminals. A third recovery rectifier is connected in series with the secondary winding between the positive and negative terminals.

In accordance with another embodiment of the invention, the pulse generator makes use of a transformer having first and second primary windings and a secondary winding having first and second output terminals wherein all windings have the same sense. As before, the generator includes a direct current source having positive and negative terminals and producing a constant direct voltage between the positive and negative terminals, the positive terminal being connected to one end of the first primary winding.

The generator also includes first and second storage capacitors, first and second switching devices, each device having mutually exclusive conductive and non-conductive states, and first and second back-resonating blocking rectifiers.

The first capacitor, the first device and the first blocking rectifier are connected in series across the first winding with the first capacitor being connected directly to the positive terminal. The second capacitor, the second device and the second blocking rectifier are connected across the second winding with the second capacitor being connected directly to the negative terminal.

The generator also includes a charge reversal rectifier and first and second recovery rectifiers. The first recovery rectifier is connected in series with the second capacitor across the positive and negative terminals. The second recovery rectifier is connected between the junction of the first capacitor and the first device and the junction of the second capacitor and the second device. A series circuit including the reversal rectifier and the first recovery rectifier is connected across the first capacitor.

In the case of the present pulse generator, this problem is solved by the characterizing part of claim 1. Advantageous further developments of the invention can be gathered from the subclaims.

The direct voltage from the source is utilized in an optimum manner by the switching devices, because commutating only takes place when the switching devices are in the dead state. As essentially only sinusoidal pulses flow in the charging and discharging circuit, for the same peak current value there is a more than 27% higher energy content than in the case of the otherwise conventional triangular pulses. In addition, the disadvantages of known circuits are avoided. This in particular effects the efficiency, the definition of the charging state of the storage capacitor and the complexity, consequently also the reliability and constructional size of the circuit.

Through the use of high energy pulses, there is a considerable improvement to the erosion process during wire cutting and during spark-erosive drilling, because even metallic short-circuits between the workpiece and the electrode are melted by ohmic heating (up to the evaporation of parts of the workpiece and/or the electrode) and can be converted into a removal-effective plasma discharge. However, this is only effectively possible as from pulse currents over approximately 500 A, due to the low resistivity.

Pulse generators according to the invention are particularly small and light. Thus, e.g. on a double Euroboard, it is possible to easily house a circuit with a peak current of 150 A and a 900 A generator can be produced in a 19" rack. This constitutes a volume reduction by at least a factor of 10 compared with existing generators.

The foregoing as well as additional objects and advantages of the invention will either be explained or will become apparent to those skilled in the art when this specification is read in conjunction with the brief description of the drawings and the detailed description of preferred embodiments which follow.

DETAIL DESCRIPTION OF THE PREFERRED EMBODIMENT

Figure 1:
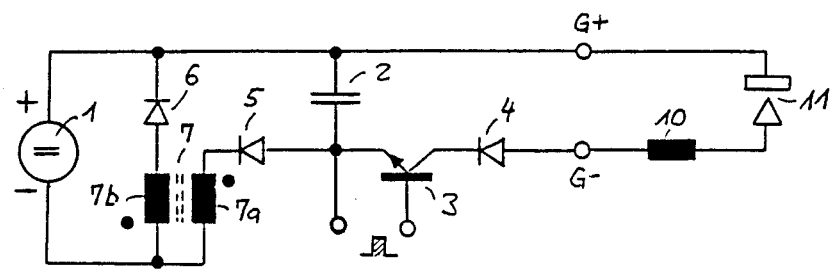
FIG. 1 Illustrates a first embodiment of the invention using flyback converter transformer in the charging regulator circuit.

FIG. 1 shows one embodiment of the invention, a direct current source yielding a constant direct voltage, is connected by its positive pole to a storage capacitor 2. Parallel to the storage capacitor is provided a discharge circuit comprising a series connection of a switching device 3, a back-resonating blocking rectifier 4, a load inductance coil 10 and a spark gap 11. The output terminals of the generator are designated G+ and G−.

The charging circuit for charging the storage capacitor 2 contains a charge reversal rectifier 5 connected to the other pole of the storage capacitor 2 and a primary winding 7a of a flyback converter transformer 7 connected in series thereto. The other terminal of primary winding 7a is connected to the negative pole of the d.c. voltage source 1. Parallel to the latter is provided a series connection of a secondary winding 7b of the flyback converter transformer 7 and a recovery or recuperation diode 6. The two windings 7a, 7b of the flyback converter transformer 7 are poled in accordance with the points shown in FIG. 1.

The circuit according to FIG. 1 functions as follows: Where the d.c. voltage source is operated, the storage capacitor 2 is charged across charge reversal rectifier 5 and the inductance coil of the primary winding 7a to approximately double the voltage of said source. Recuperation rectifier 6 only becomes conductive during this process if the transformation ratio (7a:7b) of the flyback converter transformer 7 is smaller than 1. If the switching device 3 is now placed in its conductive state, then the storage capacitor is discharged across spark gap 11, lead inductance coil 10, back-resonating blocking rectifier 4 and switching device 3, part of the stored energy being converted into spark energy. The larger part of the stored away energy flows back into the storage capacitor 2 and charges the same again with reverse polarity. The back-resonating blocking rectifier 4 prevents a further discharge, which would lead to an undesired, negative current pulse, which would cause considerable electrode wear. As soon as the voltage of storage capacitor 2 becomes smaller than that of the d.c. voltage source 1 during the discharge, a sinusoidal charging current starts to flow across charge reversal diode 5, the inductance coil of primary winding 7a and the d.c. voltage source 1. The flyback converter transformer 7 is poled in such a way that in this phase the recuperation rectifier 6 is stressed in the blocking direction. During this charge reversal process, the d.c. voltage source 1 generates an energy excess, which is the same as the current-time integral of the charging current times the voltage of the d.c. voltage source 1. The circuit is to be dimensioned in such a way that this energy excess is just large enough to cover the spark energy and the losses in the circuit. If during a discharge the energy consumed is smaller than the energy excess provided, then the storage capacitor 2 is only charged to such an extent that the self induced voltage in the secondary winding 7b is larger than that of source 1. As from this time recuperation rectifier 6 starts to conduct, so that the excess energy stored in the inductance coil of the flyback converter transformer 7 is returned to the d.c. voltage source 1. Transformer 7 is preferably constructed with ferrite cores and air gap and the known bifilar winding technology should be used in order to achieve a good magnetic coupling, despite the air gap. If it is assumed that the voltage of source 1 is E and the transformation ratio of primary winding 7a to secondary winding 7b is n, then the charging voltage of storage capacitor 2 becomes $E \cdot (1+n)$. The charge reversal rectifier 5 must be dimensioned for a voltage of at least $E \cdot 2n$ and the recuperation rectifier 6 for a voltage of $E \cdot (2+2/n)$. Typical values for E=100 V and for N=2 in the case of a smaller generator, which gives a charging voltage of 300 V and permits the use of efficient 400 V diodes. For higher discharge currents and higher values of the load inductance coil 10, it may be necessary to work with charging voltages of 500 V to even over 1000 V.

FIG. 1 generally shows that no controlled components are required for the charge control of the capacitor. It is in fact sufficient to have purely passive components, such as the rectifiers and inductance coils of a flyback converter. In order that the energy excess of the storage capacitor can be returned to the d.c. voltage source 1 after spark discharge, switching device 3 may only be rendered nonconductive when the charge reversal current through charge reversal rectifier 5 has substantially decayed. Switching device 3 is driven by a not shown pulse generator, whose maximum switching frequency is limited in such a way that it is ensured that a new discharge can only be initiated (switching device 3 becomes conductive), when recuperation is concluded. The pulse duration of the drive pulses for switching device 3 is made so long that the switching device 3 only rendered nonconductive when the discharge current has decayed.

Figure 2:
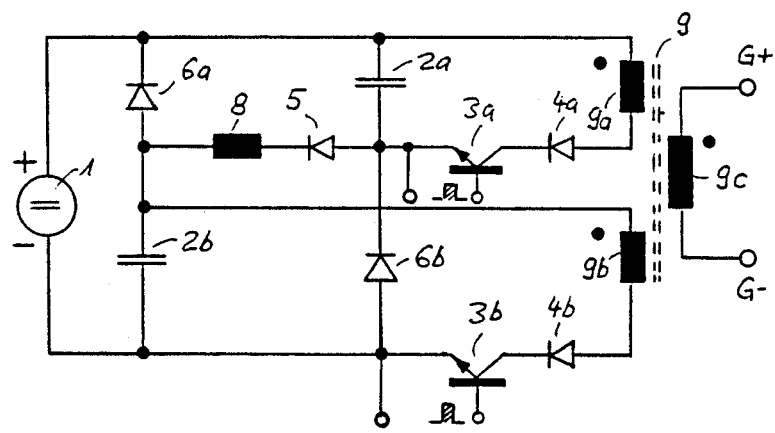
FIG. 2 Illustrates a second embodiment of the invention using two storage capacitors and an inductance coil in the charging regulator circuit.

FIG. 2 shows a second embodiment of the invention and the principle thereof is very similar to that of FIG. 1. Unlike in the circuit of FIG. 1, there are two storage capacitors 2a, 2b and two discharge circuits 3a, 4a, 9a; 3b, 4b, 9b. The circuit is constructed as follows. Parallel to the d.c. voltage source 1 is provided a series connection of a first storage capacitor 2a and a recuperation rectifier 6b connected in the blocking direction. Parallel to the d.c. voltage source 1 is provided a further series connection of a recuperation rectifier 6a and a second storage capacitor 2b (the letter a effectively designating a first circuit and letter b a second circuit). The two common connection points between storage capacitor 2a and recuperation rectifier 6b on the one hand and storage capacitor 2b and recuperation rectifier 6a on the other are interconnected by a series connection of a charge reversal rectifier 5 and an inductance coil 8.

Parallel to the first storage capacitor 2a is provided a series connection of a primary winding 9a of an isolation transformer 9, a back-resonating blocking rectifier 4a and a switching device 3a. Correspondingly parallel to the second storage capacitor 2b, there is a series connection of a further primary winding 9b of isolation transformer 9, a back-resonating blocking rectifier 4b and a switching device 3b. A secondary winding 9c of the isolation transformer is magnetically coupled to the two secondary windings 9a, 9b. The two terminals of primary winding 9c represent the generator terminals G+ and G−, to which is then to be connected the spark gap 11 (with its lead inductance coil 10 according to FIG. 1.

This circuit functions as follows. The charge regulator circuit with components 5 to 8 operates with a fixed energy excess, which, per storage capacitor 2a, 2b, comprises half the voltage of the d.c. voltage source 1 times the charging current time integral.

On switching on the d.c. voltage source 1, via the charge reversal diode 5 and inductance coil 8, the two storage capacitors 2a, 2b are charged to approximately the voltage of the d.c. voltage source 1. The discharge process functions in essentially the same way as in the first circuit with the difference that the two switching devices 3a and 3b are operated synchronously and simultaneously and consequently initiate the discharge of the storage capacitors 2a or 2b associated therewith, the two pulse currents of said capacitors then being coupled out to the generator output across the two primary windings 9a, 9b. This has the advantage that d.c. voltage source 1 does not have to be galvanically isolated from the mains. The voltage at the generator output (G+, G−) can also be matched to the transformation ratio of the isolation transformer. The following charging process of storage capacitors 2a, 2b again takes place across the charge reversal rectifier 5 and inductance coil 8 until the storage capacitors 2a, 2b have charged to the voltage of the d.c. voltage source 1. Recuperation rectifier 6a and 6b then become conductive and the energy excess remaining in inductance coil 8 is recovered in source 1. The charge reversal time can be elected via the size of inductance coil 8. This charge reversal time is on the one hand made as short as possible (e.g. 5 to 10 microseconds) to permit high pulse frequencies and on the other hand in the case of an excessively short charge reversal time, the charging current becomes unnecessarily high and the time too short in order to bring switching devices 3a, 3b into the non-conductive state. This also applies regarding the circuit according to FIG. 1.

Switching devices 3, 3a and 3b for both circuits can be constituted by the presently available rapid electronic switches ranging from bipolar transistors, across the MOSFET, GTO and SCR to the hydrogen thyratron in extreme cases. Back-blocking switches, such as e.g. thyristors can also take over the function of the back-resonating blocking rectifiers 4, 4a, 4b, which further simplifies the circuits. In the circuit of FIG. 2 the represented points show the winding polarity of windings 9a, 9b and 9c.

While the invention has been described with detailed reference to the drawings, it will be obvious to those skilled in the art that many modifications and changes can be made within the scope and sphere of the invention as defined in the claims which follow.

What is claimed is:

1. A pulse generator having first and second output terminals and adapted for use with a load including a spark gap and connected across the output terminals in order to work metals by spark erosion, the generator comprising:

a direct current source having positive and negative terminals and producing a constant direct voltage between the positive and negative terminals, the positive terminal being connected to the first output terminal;

a storage capacitor;

a switching device having mutually exclusive conductive and non-conductive states;

a first back-resonating blocking rectifier, the capacitor, the device and the first rectifier being connected in series between the first and second output terminals, the capacitor being connected directly to the first output terminals;

a second charge reversal rectifier;

a transformer having primary and secondary windings which are poled in opposite sense, the capacitor, the primary winding and the second rectifier being connected in series between the positive and negative terminals; and a third recovery rectifier connected in series with the secondary winding between the positive and negative terminals.

2. The generator of claim 1 wherein the transformer is a flyback converter transformer, the series connection of the second rectifier and primary winding constitutes a charging circuit for the capacitor, and the series connected capacitor, device and first rectifier together with the load constitutes a discharge circuit for permitting the capacitor to discharge through the load, the charging circuit being operative only when the device is in its non-conductive state, the discharge circuit being operative only when the device is in its conductive state 3. The generator of claim 2 further including means connected to the device to place the device in its non-conductive state when discharge current from the capacitor through the gap has fully decayed and to place the device in its conductive state when the discharge current flow from the capacitor through the gap is to begin.

4. The generator of claim 3 wherein the load includes an inductor connected in series with the gap.

5. A pulse generator for use with a transformer having first and second primary windings and a secondary winding having first and second output terminals, all windings having the same sense, and also for use with a load which includes a spark gap and is connected across the first and second terminals, the generator comprising:
  a direct current source having positive and negative terminals and producing a constant direct voltage between the positive and negative terminals, the positive terminal being connected to one end of the first primary winding;
  first and second storage capacitors;
  first and second switching devices, each device having mutually exclusive conductive and non-conductive states;
  first and second back-resonating blocking rectifiers, the first capacitor, the first device and the first blocking rectifier being connected in series across the first winding with the first capacitor being connected directly to the positive terminal, the second capacitor, the second device and the second blocking rectifier being connected across the second winding with the second capacitor being connected directly to the negative terminal;
  a charge reversal rectifier;
  first and second recovery rectifiers, the first recovery rectifier being connected in series with the second capacitor across the positive and negative terminals, the second recovery rectifier being connected between the junction of the first capacitor and the first device and the junction of the second capacitor and the second device; and
  a series circuit including the reversal rectifier and the first recovery rectifier connected across the first capacitor.

6. The generator of claim 5 wherein both devices are operated synchronously whereby both devices are simultaneously conductive or non-conductive.

7. The generator of claim 6 wherein the series circuit includes an inductance connected between the reversal rectifier and the first recovery rectifier.

* * * * *